Nov. 28, 1961  G. E. LARSSON  3,010,375
AUTOMATIC PHOTOGRAPHIC APPARATUS
Filed March 11, 1958  3 Sheets-Sheet 1

GEORGE E. LARSSON
INVENTOR.

BY
ATTORNEY.

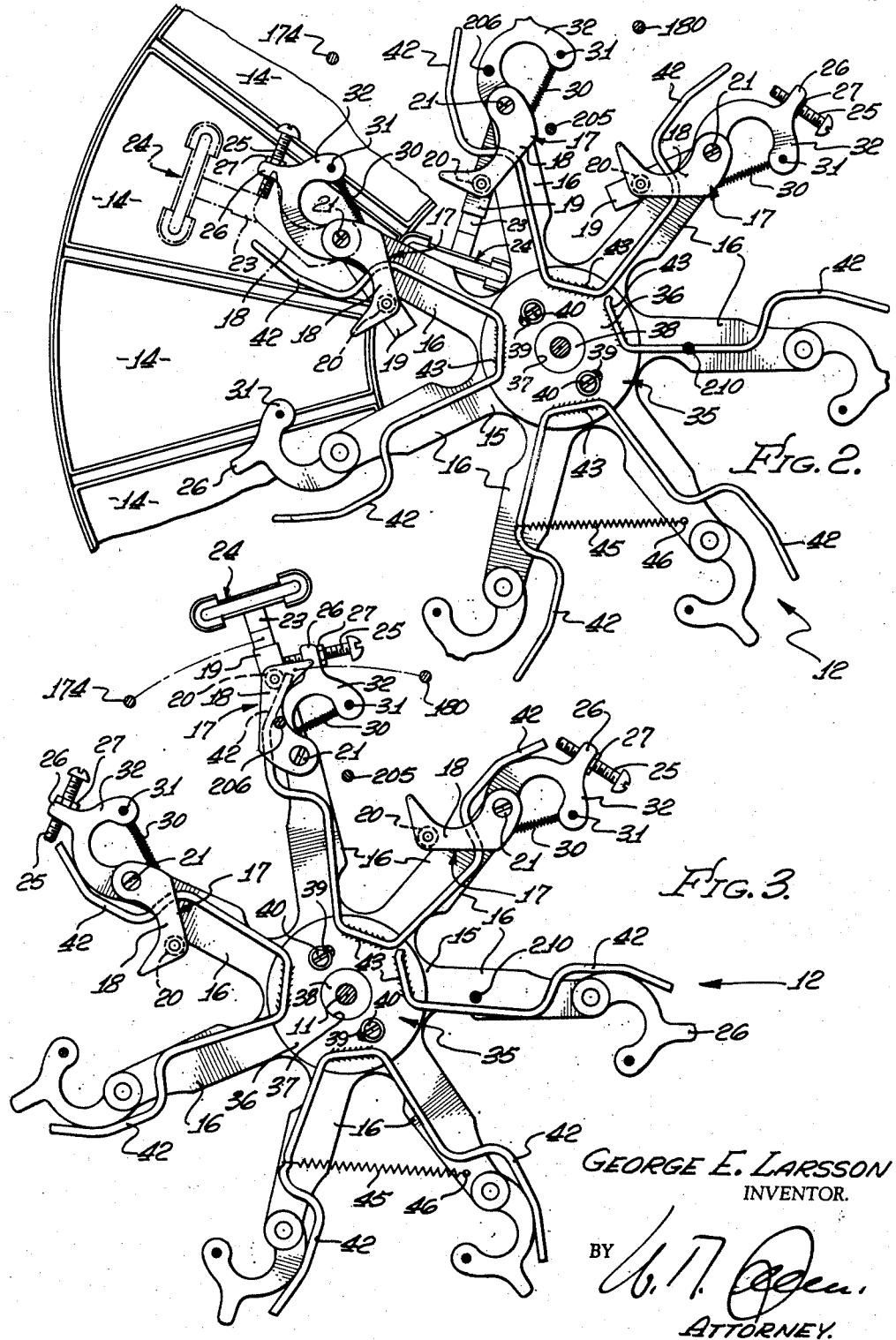

Nov. 28, 1961 G. E. LARSSON 3,010,375
AUTOMATIC PHOTOGRAPHIC APPARATUS
Filed March 11, 1958 3 Sheets-Sheet 3
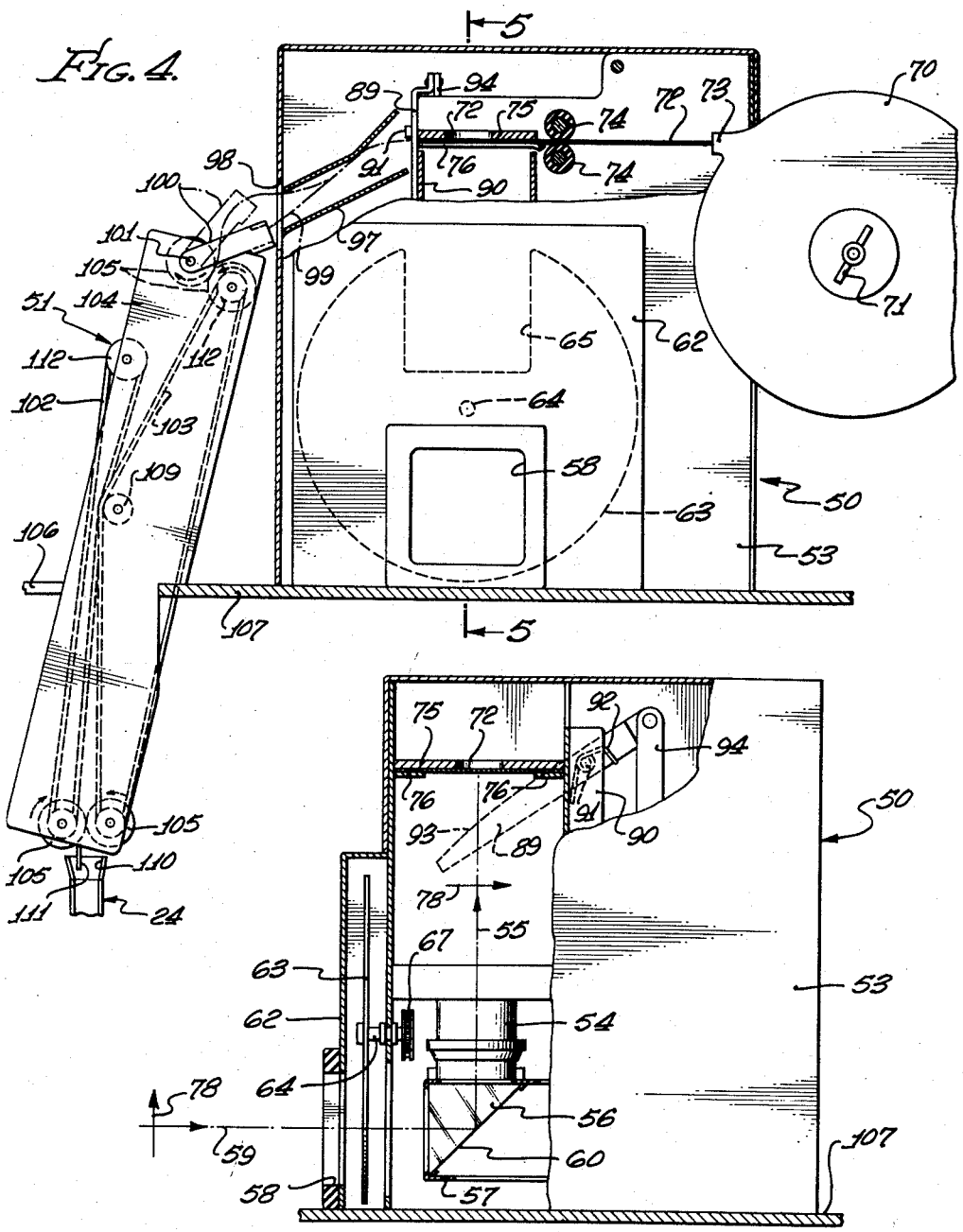
GEORGE E. LARSSON
INVENTOR.
BY 
ATTORNEY.

United States Patent Office 3,010,375
Patented Nov. 28, 1961

3,010,375
AUTOMATIC PHOTOGRAPHIC APPARATUS
George E. Larsson, La Mirada, Calif., assignor, by mesne assignments, to Philip S. Allen, Carlsbad, Calif.
Filed Mar. 11, 1958, Ser. No. 720,647
25 Claims. (Cl. 95—14)

This invention relates to automatic photographic apparatus and more particularly to a simplified and improved apparatus for forming a plurality of images of the subject in side-by-side relation crosswise of strip film and to improved control mechanism for passing one or more strips of such film through a developing cycle composed of a series of steps, the developing operation being terminated automatically as an incident to the completion of the final step for the last strip of film undergoing processing.

The present application represents certain improvements in the automatic photographic apparatus disclosed in the co-pending application for United States Letters Patent Serial No. 468,178, filed in the United States Patent Office on November 12, 1954, by Marvin C. Applegate, et al. It will be understood that reference should be had to that application for an understanding of certain structural details of those components which are utilizable as a unitary assembly in the present invention without need for changes. Accordingly, and for the most part, only those components incorporating changes and the improvements of the present invention are here shown in detail, the others being shown diagrammatically and schematically.

It is pointed out that the present invention, though not limited to fully automatic use, is intended for employment in photo studio apparatus of the subject-operated type without need for the presence of an operating attendant or labor of any kind in the handling and processing of the film. The automatic coin control apparatus is not shown, it being understood that suitable conventional coin mechanism is preferably incorporated in the circuit and used to initiate the cycling of the electrical control apparatus. The latter functions to activate a series of electronic flash type illuminating lights and to trigger such lights sequentially in predetermined order as strip film is advanced from a supply roll thereof through the camera, the strip and the associated camera being so arranged that images of the subject are impressed in side-by-side relation crosswise of the film strip. Following completion of a group of images of the subject, the exposed film is severed from the supply roll and automatically loaded into a film carrier as the carrier is presented opposite the camera film port and the associated film feed-down assembly. The control mechanism then functions in cooperating with automatic conveyor mechanism to advance the exposed film through a developing cycle including a series of developing and washing tanks. When the film reaches the end of the cycle, a film delivery motor is activated to deliver the finished strip of pictures to the subject customer. If no other film strips are then undergoing processing, the apparatus functions automatically to de-activate all components of the apparatus until the insertion of the proper coins in the coin mechanism initiates a new photo taking and developing cycle. But if other film strips are being processed, the developer continues in operation until completion of the final strip and the delivery of the pictures to the customer.

A feature of the automatic photographic apparatus disclosed in the above-mentioned co-pending application, No. 468,178, is the provision of means making it unnecessary to await the completion of one cycle before a subsequent and overlapping cycle is superimposed on one or more active developing cycles. This operating capability necessitated the provision of suitable components for assuring that individual cycling operations were carried to completion and that the individual film strips involved in each cycle were dispensed at the end of their respective processing cycles. It was further necessary to provide means for de-activating the entire apparatus following the complete processing of the last film strip introduced into the apparatus. The counting and control mechanism heretofore provided to perform these functions, though reliable, left much to be desired owing to its complexity, high cost and the maintenance problems presented. Due to the number of components and individual parts comprising each, these prior devices are subject to malfunctioning more frequently than would simpler mechanisms with the result that servicing operations are costly.

The present invention provides a greatly simplified mechanical control featuring a single moving part movably mounted on the film carrier conveyor spider. This single moving part has limited movement relative to the conveyor spider and features fingers rigid with its main body and each positioned to be contracted by a pivoting support for the film carriers. When all the film carriers are pivoted to their retracted position, as they are when no film is presented for development, a spring is effective to hold the movable control in a position for opening a main control switch thereby de-energizing the entire photographic apparatus. However, so long as any film carrier is pivoted to its extended film developing position an associated finger of the control member is contacted by that film carrier and holds the control member out of actuating position relative to the main control switch. Should any one of the other film carriers be pivoted to an extended position, it likewise remains effective to hold the control fingers out of de-activating position relative to the main switch until this film carrier is returned to its retracted position. Accordingly, so long as any film carrier remains extended as is required while developing film, all control fingers remain ineffective to open the master switch until such time as all carriers have been retracted.

Another feature of the invention is the provision of a simplified and improved means for illuminating the subject momentarily during the registering of the subject's image on the film strip. In prior illuminating assemblies, two or more strobe or electronic flash type lamps were activated from a common control switch so arranged that each lamp was energized from condenser means common to all lamps. Not infrequently this resulted in out-of-phase firing of the lamps and the inadequate illumination of the subject. By the present invention this undesirable happenstance is obviated by the use of a circuit assuring the simultaneous firing of all lamps irrespective of the number being activated simultaneously.

Other features of particular importance include a new arrangement of the camera optical system relative to the film and a revised disposition of the feed-down or film loading mechanism, not only providing greater efficiency and more positive control and feeding of the film but, of special importance, the location of the longitudinal axis of the image transversely of the strip rather than longitudinally as heretofore, thereby affording important advantages not heretofore enjoyed.

Accordingly, a primary object of the present invention is the provision of improved and simplified automatic photographic apparatus adapted to be activated by an act of the subject being photographed and which thereafter functions automatically to take a series of views of the subject and to process the film and deliver it to the subject without any further act by anyone.

Another object of the invention is the provision of automatic photographic apparatus having simplified and improved control mechanism operable to continue the developing assembly in operation so long as any film present therein remains undeveloped and for thereafter automatically de-activating the developer.

Another object of the invention is the provision of automatic photographic apparatus incorporating an improved and more efficient camera assembly and means for impressing a group of images on a film strip and for severing and loading the exposed film into developing mechanism.

Another object of the invention is the provision of improved illuminated means employing a plurality of electronic flash lamps so connected and arranged that two or more can be fired simultaneously and in synchronism with one another repeatedly and over a long service life.

Another object of the invention is the provision of automatic film developing apparatus arranged to process film strips individually or in overlapping cycles as supplied to the developer and featuring the use of simple, positively acting control means for de-activating the developer only after all film strips present in the developer have been fully processed and delivered.

These and other more specific objects will appear upon reading the following specification and claims and upon considering in connection therewith the attached drawings to which they relate.

Referring now to the drawings in which a preferred embodiment of the invention is illustrated.

FIGURE 2 is a fragmentary top plan view of the film carrier spider and the unitary control member movably mounted thereon showing one of the film carriers retracted in a non-film-developing position;

FIGURE 3 is a view similar to FIGURE 2 but showing the position of parts with one film carrier and its supporting arm in its extended film-developing position;

FIGURE 4 is a vertical sectional view through the camera assembly; and

FIGURE 5 is a fragmentary view of the camera assembly with portions broken away to show the optical system and other components as viewed along line 5—5 on FIGURE 4.

Figure 1:
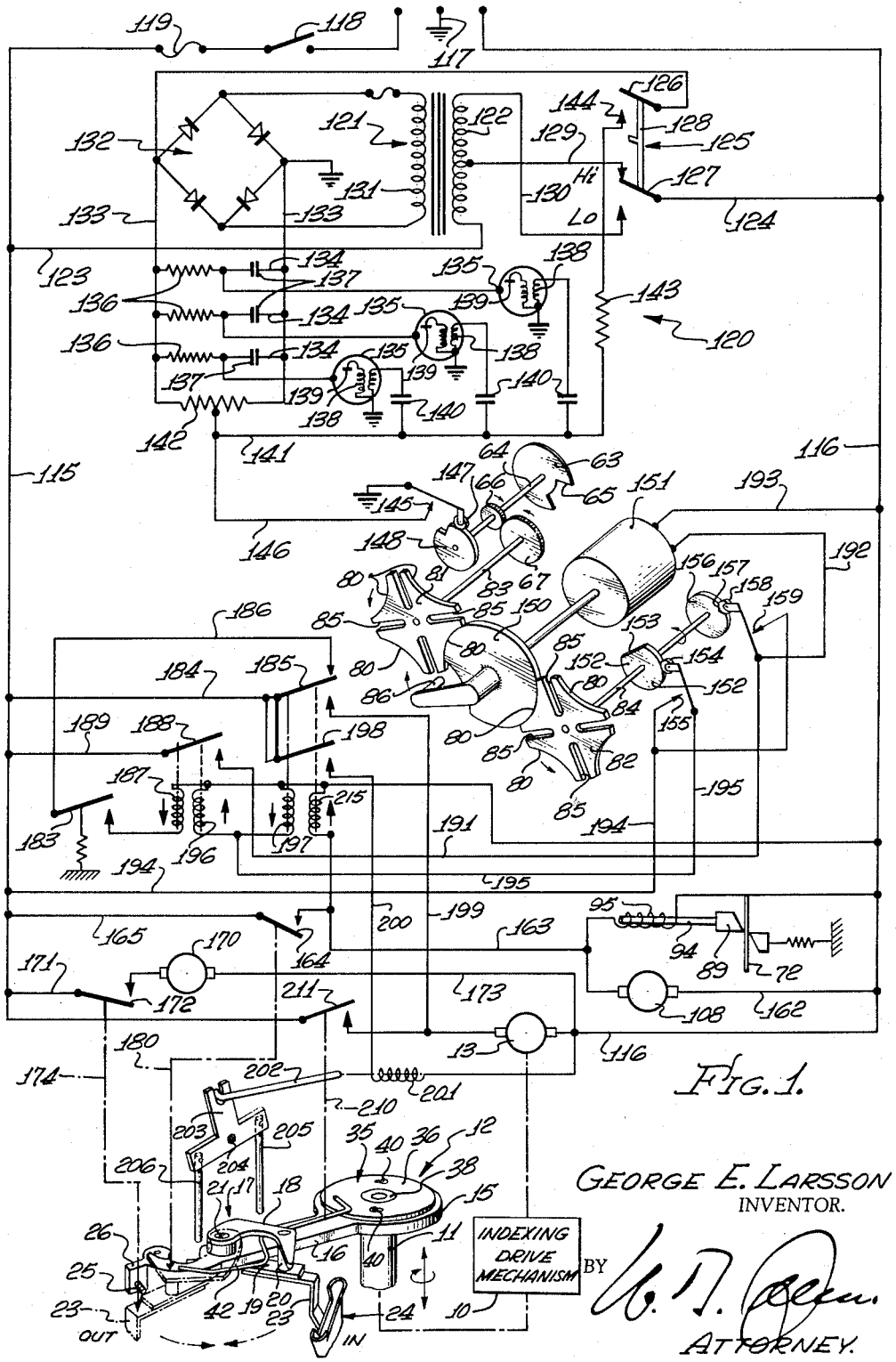
FIGURE 1 is a schematic wiring diagram of the control circuit incorporating features of the present invention.

As has been explained in the aforesaid co-pending application, the apparatus of this invention is of the type enclosed in a light-proof booth and having a seat for the subject while being photographed. Draw curtains are normally provided to shut out extraneous lights and providing privacy for the subject. Prominently displayed operating instructions direct the subject to deposit specified coins in a conventional coin receiving and counting mechanism, the deposit of the requisite coin serving to activate the automatic control circuit to be described in detail below.

It will be understood that forwardly of the seat occupied by the subject and on a line with the upper portion of the subject's body is a camera compartment having an optical lens normally closed to the admission of light by a shutter mechanism. Following the repeated momentary opening of the shutter and the exposure of a series of views under the control of the automatic control circuit, the exposed film is severed from the supply strip and delivered to a loading conveyor which is operative to load the strip into the mouth of a film carrier, there being a plurality of such carriers attached to conveyor mechanism associated with the film developing assembly located in a light-tight compartment directly below the camera compartment. The film is then advanced successively through a series of developing solution and washing tanks following which the fully developed film is passed through squeegee rollers and vended into a receptacle on the exterior of the booth.

Inasmuch as major portions of the above-referred to components usable with the present invention are disclosed and described in the above identified application, reference may be had to that application for further information if of interest. Although the present invention is not limited to use with the film developing assembly there disclosed, it will perform the desired and essential functions of an automatic photographic studio and is a preferred type of developer.

Referring now to FIGURE 1 illustrating the schematic control circuit of this invention, the film developing assembly is seen to comprise a gear box 10 operable to reciprocate the vertically disposed conveyor shaft 11 and, intermittently, to index this shaft through a short arc sufficient to advance film undergoing processing from one tank 14 to another. It will therefore be recognized that film conveyor 12 reciprocates vertically through very short strokes for brief periods following which it is elevated to a much higher level as the film carrier 24 is indexed to the next tank.

As shown in FIGURE 1, conveyor spider 12 includes a hub 15 fixed to the top of shaft 11. Although only one of its radial arms 16 is shown in FIGURE 1, it is pointed out that it has a plurality of identical arms 16 equally spaced from one another and each having pivotally supported near the outer end thereof a film carrier support designated generally 17. Support 17 is generally U-shaped having its two horizontal legs 18 and 19 rigidly joined by a vertical post 20 and having the free ends of its legs pivotally connected to the upper and lower sides of spider arm 16, as by a pivot screw 21. It is pointed out that post 20 limits the pivotal movement of support 17 through an arc of approximately 180 degrees between the retracted position shown in full lines in FIGURE 1 wherein post 20 contacts the side of arm 16 and its extended position shown in dot and dash lines in the same figure. Fixed to the underside of arm 19 of support 17 is an L-shaped strip 23 having its vertical leg fixed to the side wall of an open-topped flattened tubular film carrier 24. It will therefore be clear that carrier 24, when retracted, is positioned parallel and close to conveyor shaft 11 with the result that, when not loaded with film, the carriers bypass the solutions and thereby avoid the contaminate of one solution with portions of another solution. In its extended film developing position, however, the L-shaped support 23 and the carrier attached thereto is positioned beyond the outer end of conveyor arm 16 as is indicated by dot and dash lines in FIGURE 1 and in full lines in FIGURE 3. The positioning of carriers 24, particularly when extended, is important in order that they may be reciprocated without engagement with the edges of the film developer tanks 14 arranged in a ring about shaft 11 as indicated in FIGURE 2. The proper positioning of carriers 24 in their extended condition is assured by an adjusting screw 25 threaded through an opening in boss 26 at the end of arm 16 and positioned to abut the edge of lower arm 19 of the pivoting support 17, screw 25 being locked in place by a lock nut 27.

Each of film carriers 17 is spring biased to both its extended and retracted positions by an overcenter tension spring 30, one end of this spring being anchored to a pin 31 projecting downwardly from the hooked end 32 of arms 16, and the other end being similarly anchored to a pin projecting downwardly from the underside of arm 19. It will be recognized that, in its retracted position, the center line of spring 30 lies to the right of pivot pin 21 as viewed in FIGURE 3, whereas in the extended position of support 17 the spring center line lies on the opposite side of the pivot pin. Although FIGURES 2 and 3 do not so illustrate, it will be understood that the outer ends of each of arms 16 are provided with pivoting U-shaped supports 17 secured to these arms by pivot screws 21 and spring biased to each of their extreme positions by a tension spring 30. Each arm 16 is also provided with a boss 26 adjustably supporting a stop screw 25 serving to position the film carriers properly and as desired in their extended positions.

A particularly important feature of the invention is the single moving part employed to sense the positions of the film carriers and when all have been pivoted backwardly from their extended positions into their retracted positions, then becoming operative to discontinue the operation of the apparatus. This unitary control element is designated generally 35 and comprises a disc 36 having an opening 37 centered about a boss 38 projecting coaxially from the top side of hub 15 for conveyor spider 12. Control element 35 is held assembled to hub 15 by means of a pair of screws 40 extending through short arcuate slots 39 and seated in threaded openings in hub 15. The length of slots 39 is such that control element 35 can rotate back and forth through an arc of approximately 10 to 14 degrees between the two positions illustrated respectively in FIGURES 2 and 3. Projecting radially from disc 36 are control feelers or fingers 42, these being welded or otherwise rigidly secured to the disc as indicated at 43. There is one feeler finger 42 associated with and lying close to the upper side of each of arms 16. Control element 35 is biased counterclockwise as viewed in FIGURES 2 and 3 by a spring 45 having one end connected to one of the feeler fingers 42 and its other end anchored to a post 46 on one of arms 16, it being understood that slots 39 in cooperation with mounting screws 40 serve to limit the counterclockwise movement to the position shown in FIGURE 2. The outer ends of the feeler fingers 42 extend between the upper and lower arms 18 and 19 of pivoting support 17 and in position to be contacted by post 20 when support 17 pivots to its extended position. It is pointed out and emphasized that springs 30 are stronger than spring 45 and any one of springs 30 is effective to rotate control element 35 clockwise as viewed in FIGURES 2 and 3. Other features of the conveyor mechanism will be described later in connection with the operation of the film feed-down mechanism and the camera which follows immediately below.

Referring now to FIGURES 4 and 5, there is shown certain details of the camera designated generally 50 and the associated film feed-down and loading device designated generally 51. The camera proper is housed in a light-tight casing 53 provided with a lens system 54 the optical axis of which is indicated by the dot and dash line 55 in FIGURE 5. As shown, lens system 54 is supported directly adjacent one face of a 45 degree prism 56 suitably supported by frame 57 rigidly secured to the camera casing. It is pointed out that the axis of the image of the subject being photographed enters the camera through aperture 58 along the horizontal axis 59 and is reflected by the rear surface 60 of prism 56 into the lens system 54. Aperture 58 is formed in part in a housing 62 forming part of the camera casing and enclosing a suitable shutter disc 63 mounted on shaft 64. As is best shown in FIGURES 1 and 4, shutter 63 comprises a disc having a cut-out 65 for admitting the image when the cut-out is opposite aperture 58. The shutter is adapted to be driven in synchronism with other features of the camera through a pair of meshing gears 66, 67.

Referring to FIGURE 1, it will be observed that the camera shutter is arranged to be driven by the camera motor 151 having a disc 150 on its shaft meshing with arcuate cut-outs 80 in a pair of Geneva gears 81, 82 disposed to either side thereof. Gear 81 is mounted on a shaft 83 driving gear 67 and gear 82 is mounted on a shaft 84 supporting switch control cams 152 and 156, the purpose of which will be described presently. Geneva gears 81, 82 have the usual radial slot 85 for receiving the crank pin 86 carried on the end of the motor shaft and functioning in known manner to advance gears 81 and 82 one quarter turn for each revolution of the camera motor. Cut-outs 80 in cooperation with control disc 150 hold the Geneva gears motionless between periods of advance. It is also pointed out that gears 66 and 67 have diameters such that shutter 63 rotates one revolution for each quarter turn of gear 67.

Referring to FIGURE 4, it is pointed out that the supply of continuous strip film is contained on a spool enclosed within reel drum 70 having a cover normally held closed by a thumb screw 71 and suitably supported in one side wall of the camera casing. The film strip 72 passes through an outlet 73 horizontally transversely of the camera housing between a pair of feed rollers 74 connected to the camera motor by suitable drive connections (not shown) and advance the film past a backing plate 75. Aiding plate 75 in holding the film flat and accurately positioned in alignment with axis 55 of the optical lens system 54 are suitable guide strips 76 best shown in FIGURE 5. It is pointed out that, during each revolution of shutter 63, the drive means for feed rollers 74 are arranged to advance a predetermined increment of unexposed film sufficient for registering a single subject image. The film is thus advanced by a single image increment for each rotation of the shutter 63, it being understood that the film images are closely spaced together transversely of film strip 72.

As will be best appreciated from a consideration of FIGURES 4 and 5, the camera lens system, including prism 56, and the film feeding mechanism is so arranged as to direct a vertical image of the subject onto the film crosswise of the strip rather than lengthwise as has been the practice heretofore. For example, if a vertical arrow image 78 enters the camera optical system along axis 59, it will be impressed on film 72 with its axis extending crosswise of the film.

The means for severing a strip of exposed film containing a series of subject images arranged side-by-side comprises a cut-off knife 89 pivoted to side wall 90 by a pivot pin 91. Normally blade 89 is held inclined downwardly in the position shown in FIGURE 5 by a torsion spring 92 supported on pivot pin 91, the upper or cutting edge 93 of the knife then being below the outlet aperture for the film in side plate 90. Knife 89 is adapted to be pivoted upwardly to sever a strip of film by means such as a link 94 connected to the free end of the knife blade and having its lower end arranged for actuation by solenoid 95 (FIGURE 1). It will be understood that the showing of the film cut-off and its operating solenoid is illustrated diagrammatically in FIGURE 1 and is energized only after a desired number of subject images have been impressed on the film.

The exposed film strip passes into guide tunnel means 97 having its lower end discharging through an aperture 98 in the side wall of the camera casing, the walls of the tunnel being disposed to feed the film strip 99 into a hollow film guide 100 pivoted at its lower ends on pins 101 to the sides of the film loading and feed-down device 51. By means of the latter the exposed film strip 99 is guided between soft rubber rollers 105 journaled in side plates 104 of device 51. As is indicated in FIGURE 4, the feed-down mechanism 51 extends through an aperture 106 in a horizontal partition 107 dividing the camera compartment from the film developing compartment of the photographic booth. The feed-down device may include a pair of conveyor belts 102 and 103 driven in opposite directions by a suitable motor 108 (FIGURE 1) arranged to be energized simultaneously with the film cut-off solenoid 95 and supported in part by pulleys 112 and in part by pulleys on the same shafts as rollers 105. An idler roller 109 is supported between side plates 104 in a manner to press the adjacent runs of the belts together as illustrated in FIGURE 4. The described feed-down mechanism may be constructed otherwise so long as it is effective to feed the film into the bell-shaped upper end 110 of one of the film carriers 24. The upper end of the carrier may be guided into loading position by a pilot tab 111 supported between side plates 104 of the feed-down mechanism, and functions additionally to guide the issuing lower end of the film strip into the carrier.

A feature of the feed-down mechanism and of the pivoting pilot device 100 is the capability of the latter in positively guiding the advancing film end between the upper pair of rollers 105 in readiness to be advanced through feed-down device 51 upon the activation of feed-down motor 108 and the severing of the exposed film strip by knife 89 which actions occur simultaneously as will be explained more fully presently.

Reference will now be had to FIGURE 1 showing the schematic wiring diagram of the control mechanism for the described automatic photographic apparatus. All electrically energized parts of the mechanism are connected between the two hot bus wires 115 and 116 extending vertically along the opposite sides of FIGURE 1. Ground wire 117 appears centrally between the inlet ends of the two hot busses at the top of the figure. It will be understood that the hot busses are provided with a main cut-off switch 118 and are suitably protected by a safety fuse 119 in accordance with customary practice.

The circuit for energizing the flash lamps to illuminate the subject while being photographed and forming a feature of the invention is designated generally 120 and occupies the upper central portion of the schematic diagram. A step-up transformer 121 has its primary 122 connected across the hot leads 115, 116 by connections 123 and 124 and a subject-operated light intensity switch designated generally 125. This switch includes a pair of blades 126, 127 connected by an operating handle 128 and arranged to occupy either its upper closed position illustrated in FIGURE 1 or an alternate lower closed position. When closed upwardly as shown, power is supplied through lead 129 to an intermediate tap on primary 122 thereby energizing the illuminating lamps with greater brilliance than when the switch is closed downwardly.

Secondary 131 of the transformer is connected to a rectifying bridge circuit 132 operable to convert the A.C. power supply to direct current as required for energizing leads 133 extending to the individual activator circuits 134 for each of the strobe lamps 135. Each activator circuit 134 includes a resistor 136 and a capacitor 137 connected in series with one another and in parallel across the direct current supply leads 133, 133. It will be understood that the strobe lights are of conventional design including a transformer 138 having a grounded lead interconnecting the primary and secondary. The opposite end of one of these coils is connected to a plate 139, the other coil end is connected to a capacitor 140. The opposite sides of capacitors 140 are connected through lead 141 to the mid-portion of a resistor 142 connected across the direct current lead lines 133, 133. Another resistor 143 has one end connected to lead 141 and its other end connected to contact 144 of light intensity switch 125. Activator circuits 134 and capacitors 140 are maintained charged and in readiness to discharge through the strobe lights 135 instantly upon the closing of the bright light switch 145. The latter has one side grounded and its other side connected through lead 146 to lead 141, it being understood that switch 145 is normally held open by its follower 147 so long as this follower is in contact with the raised portion of cam 148. Control cam 148 for the bright light switch 145 is fixed to shutter shaft 64 and functions to close switch 145 briefly as shutter cut-out 65 moves into registry with camera light aperture 58 so that the lamps flash at this instant to illuminate the subject.

By the time shutter cut-off 65 has rotated past aperture 58, cam follower 147 will be on the high portion of cam 148 and switch 145 will be open allowing the capacitors of the lamp firing circuits to recharge in instant readiness for the next lamp firing operation.

As has been pointed out above, camera motor 151 drives the shutter control components in synchronism with a second Geneva gear 82 fixed to a shaft 84 having secured thereto a pair of cams 152 and 156, respectively, controlling the developer control switch 155 and stop switch 159 for cutting off the camera drive motor 151. The relative positions of the cams, depressions, and the associated cam followers of switches 145, 155 and 159 at the end of an operating cycle is that indicated in FIGURE 1. This is likewise true of the illustrated positions of all other switches shown in FIGURE 1 with the exception of the master control switch 118 which is normally closed.

The mechanism for delivering developed film strips from a carrier 24 of the developing mechanism and dispensing it from the photo booth includes a motor 170 having one side connected to hot lead 115 through lead 171 and the delivery unit switch 172, the other side of motor 170 being connected through lead 173 to hot lead 116. Depending from switch 172 is an actuator rod (indicated diagrammatically in FIGURE 1 by dot and dash line 174) having its lower end positioned to contact the horizontal leg of the L-shaped support 23 for film carriers 24 as a particular carrier is elevated into delivery position with respect to the film delivery mechanism at the conclusion of the film developing cycle. It will be understood that during the final stage of the elevation of the carrier containing the developed film actuator rod 174 is elevated closing the switch 172 to energize the delivery unit for a sufficient period to grasp the exposed end of the film strip in the carrier and dispense it from the studio. An instant later, the conveyor mechanism is indexed through a small angle thereby allowing rod 174 to drop and open the film delivery switch 172. In the manner described, film conveyor mechanism 12 operates to elevate rod 174 to activate the delivery motor 170 briefly each time a film carrier pivoted outwardly to its extended position is elevated against the lower end of rod 174. If an arm 16 of the film conveyor is indexed to a position opposite rod 174 without having its associated film carrier pivoted outwardly, it will be apparent that the rod is not actuated and that the delivery motor 170 is not energized until such time as a film carrier containing a film is presented opposite the lower end of actuator rod 174.

The means for activating the feed-down mechanism and the film cut-off knife 89 will now be described, reference being had to FIGURES 1, 2 and 3. In the interest of simplicity, actuator rod 180 for the feed-down switch 164 is shown opposite the same index station of the conveyor means as rod 174 for the delivery unit switch 172 in FIGURE 1. In actual practice, however, it will be understood that actuator rods 174 and 180 are separated from one another by two indexing steps of conveyor mechanism 12 so as to be actuated in time spaced relation rather than simultaneously as is suggested by the schematic showing in FIGURE 1. This is obviously desirable since it is not feasible to load film into the same carrier from which a strip of developed film is being withdrawn unless special mechanism is added to perform these operations in sequence. As here shown, the lower end of actuator rod 180 is positioned to overlie the outer end of arm 18 of the film carrier support 17 whenever the latter is pivoted to its extended position, the point of contact of rod 180 with arm 18 being indicated by the arrow in FIGURE 1. As was true with respect to actuator 174, rod 180 is positioned to close the normally open switch 164 controlling the film cut-off knife and feed-down motor 108 at the upper end of the vertical stroke of conveyor shaft 11, cut-off solenoid 95 and feed-down motor 108 being energized for a sufficient interval to sever the film and to feed it through conveyor mechanism 51 into elevated film carrier 24 positioned directly thereunderneath, as is illustrated in FIGURE 4. By the time this has been accomplished, conveyor mechanism 12 will have been indexed clockwise allowing actuator rod 180 to drop and open switch 164 de-energizing the solenoid and feed-down motor 108.

There remains to be described the manner in which the operating cycle of the apparatus is initiated. The coin mechanism into which the customer or subject to be photographed deposits the necessary coins is not shown, but it will be understood when the requisite coins are present these will effect the closing of vending switch 183 and initiate automatic cycling of the described photo studio apparatus. Thus, upon the closing of vending switch 183 current is supplied from hot lead 115 through lead 184, the upwardly closed relay switch 185, lead 186, vending switch 183 to the camera latch-in coil 187, through lead 190 to the other hot bus 116. The current flow so provided closes switch 188 with the result that current is supplied from hot lead 115 through lead 189, switch 188, leads 191, 192 to camera motor 151 and from there through lead 193 to hot bus 116. The energized camera motor rotates cam 156 sufficiently to close camera stop switch 159 and provide a continuing supply of current to motor 151 through leads 192, 193 and 194 after the opening of relay switch 188 and until cam 156 has completed a full revolution.

The camera motor continues in operation while taking a group of film exposures on consecutive increments of the film strip as shaft 84 is indexed counterclockwise. As this operation proceeds follower 154 rides onto the long flat surface 153 of cam 152 closing switch 155 and thereby energizing relay coils 196 and 197. As is indicated by the arrows beside these coils, the energization of coil 196 (known as the camera latch-out coil) opens switch 188 upwardly and the energization of coil 197 (known as the developer latch-in coil) closes the connected switches 185 and 198 downwardly. The closing of switch 185 supplies current through leads 184, switch 185 and lead 199 to developer motor 13 driving the mechanism in casing 10 in a manner to index conveyor mechanism 12 to process the film strips and to deliver the finished product to the delivery mechanism. The simultaneously closed switch 198 supplies current through lead 184, switch 198 and lead 200 to energize the developer solenoid 201 and shift rod 202 to the right as viewed in FIGURE 1. This tilts the T-shaped lever 203 clockwise about fixed pivot 204 thereby lowering rod 205 into the path of arm 18 of film carrier support 17 as a similar rod 206 is elevated upwardly above the path of arm 18.

It will therefore be understood that when developer conveyor mechanism 12 is elevated to its uppermost position and rotated clockwise, post 205 will contact arm 18 and pivot film carrier 24 to its extended position about pivot pin 21. It is also pointed out at this time that the de-energization of solenoid 201 allows a spring (not shown) to shift rod 202 to the left, as viewed in FIGURE 1, reversing the position of posts 205 and 206 so that post 206 will contact arm 18 of any extended film carrier 24 crossing its path whereby, upon indexing of conveyor 12, post 206 will be effective to pivot carrier 17 in a reverse direction and return the same to its retracted position close to shaft 11.

Another important operation occurring as the film carrier is swung to its extended position is the contacting of the associated finger 42 with the vertical post 20 of the film carrier support 17. In this connection it will be recalled that when the supports 17 of all film carriers are in their retracted positions, the control spider 35 supporting fingers 42 is rotated counterclockwise by spring 45 to the position shown in FIGURE 2. In this position the shank portion of one of fingers 42 will underlies the vertically reciprocable actuator rod 210 controlling the position of the developer motor switch 211.

It will be understood that actuator 210 is slidably supported in fixed journal means such that, in any index position of mechanism 12, one of the fingers 42 will underlie the lower end of the rod and be effective to elevate the rod and open switch 211 provided all of the film carrier suports 17 are retracted leaving spring 45 free to hold disc 36 and the attached fingers 42 rotated to the position shown in FIGURE 2. However, whenever and so long as any film carrier support 17 remains pivoted outwardly to its extended position, post 20 thereof lies against one of the fingers 42 and holds the control device 35 rotated to the position shown in FIGURE 3 wherein actuator rod 210 for switch 211 cannot be contacted by finger 42 with the result that switch 211 is held closed by the weight of the actuator rod 210 thereby maintaining developer motor 13 energized. It is for this reason that each of the film carriers may be loaded with film to be developed in any order and in any time relationship with complete assurance that the developer will continue in operation until the last filled film carrier has completed a full developing cycle and has been pivoted to its retracted position. Such retraction leaves spring 45 free to rotate control spider 35 counterclockwise to the position shown in FIGURE 1 so that the next elevation of the conveyor mechanism to its maximum height will be effective to lift actuator rod 210 to open switch 211 and de-energize developer motor 13. Since this can occur only when the conveyor is in a predetermined position and at its maximum height, assurance is provided that the complete apparatus will be de-activated in a predetermined position of the various components.

Assuming now that the first film strip to be developed is ready for processing and that film carrier conveyor 12 has been indexed clockwise by one indexing step past the 12:00 o'clock position shown in FIGURE 2 to the 12:30 o'clock position, then the next maximum elevation of conveyor 12 will allow extended arm 18 of film carrier support 17 to lift switch actuator rod 180 and close switch 164. At this time, it is pointed out when the conveyor spider includes seven arms 16, as it does in the illustrated embodiment, the indexing mechanism advances conveyor 12 one/fourteenth of a complete revolution during each indexing step. Accordingly, during the first indexing step of support arm 16 past the 12:00 o'clock position (overlying which are posts 205 and 206 of the carrier pivoting mechanism) post 205 lies in the path of advance of the adjacent carrier support 17 and pivots it outwardly to its extended position. When the conveyor spider is again elevated it will be seen that the upper surface of arm 18 adjacent post 20 is directly beneath actuator rod 180 wherein it is effective to elevate rod 180 and close switch 164. The closing of switch 164 supplies current through lead 165, switch 164, lead 163 to feed-down motor 108 and also to the cut-off solenoid 95. Owing to the fast action of the camera mechanism and the time delay characteristics of the described control circuit, the full number of images of the subject have been taken and the film strip is ready to be severed and fed into the particular carrier 24 presented below the film feed-down mechanism 51.

Thereafter the film conveyor mechanism continues to be indexed in steps as the film carriers are moved vertically through a short path while submerged in the solution of each of the underlying developer tanks 14 understood to be arranged in a circle about shaft 11 of the developer mechanism. By the time the film strip undergoing processing has been indexed from the 12:30 position to the 10:00 position, as viewed in FIGURE 2, the developing operation will be complete. On the next indexing operation the supporting arm 23 for carrier 24 is elevated beneath the lower end of actuator rod 174 controlling the power supply to the delivery unit motor 170. Accordingly, simultaneously with the elevation of the carrier to its maximum height and the energization of motor 170, the film is presented between the rollers of the delivery unit (not shown, but similar to that described in the aforesaid pending application) and dispensed into the receiving hopper exteriorly of the studio.

It is also pointed out that as the extended carrier was pivoted outwardly at the beginning of the developing cycle and while the carrier was being indexed to its second or 12:30 position, as viewed in FIGURE 2, the extended arm 18 was positioned to elevate actuator rod 180 of switch 164 as the conveyor is lifted to its maximum height thereby closing switch 164 and energizing relay coil 215 to move switch 198 upwardly to its open position and switch 185 to its upper contact. The opening of switch 198 de-energizes solenoid 201 allowing the spring to shift rod 202 to the elft lowering post 206 into the path of the next extended film carrier from which a developed film has just been delivered and rotating this carrier back to its retracted position. Likewise, the closing of switch 185 upwardly re-establishes the circuit to the vending switch 183 rendering the latter effective to initiate a new camera cycle whenever the proper coins are placed in the coin box to close switch 183. When this occurs it is to be understood that the relay switches are energized sequentially in the same manner described above to assure continued operation of the different components as necessary to assure the proper operation of the camera simultaneously with the continued processing of a film strip already in the developer as well as the full processing of the strips then undergoing exposure.

Accordingly, in the manner described, it will be clear that any number of film strips may be introduced into the cycle in any order and in any time relationship without need for any adjustments in the controls and with assurance that each film will be processed in order and in identically the same manner as though only a single strip is processed at any given time. So long as any strip is being presented for development, one of the film carriers will be pivoted outwardly and will be effective to hold the associated control finger 42 pivoted to a position out of registry with actuator rod 210 for main cut-off switch 211. In these circumstances the developer motor continues in operation until the last film strip has been delivered and its carrier has been pivoted to its retracted position. This releases the control spider 35 for rotation to the position shown in FIGURE 2 wherein its shank portion of one of its fingers 42 underlies rod 210 with the result that on the next elevation of the conveyor cut-off switch 211 is opened leaving all parts and switches in the position in FIGURE 1.

While the particular automatic photo studio apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a photo studio apparatus of the type adapted to have its complete operating cycle including all steps of the cycle carried out automatically following insertion of coin in coin collection means forming a part of said apparatus and having mechanism for transporting an exposed strip of light-sensitive film sequentially through a series of developing operations which mechanism includes a film carrier adapted to be loaded with a film strip from a camera assembly, that improvement in said automatically cycling photo studio apparatus wherein said camera assembly includes shutter and lens means for projecting a row of upright subject images crosswise of a continuous strip of film, means for advancing unexposed film in increments lengthwise across the projection path of said upright image and outwardly through an opening from said camera, power driven conveyor means having a plurality of film carriers thereon movable in steps to a film charging position adjacent said camera opening, means for severing successive lengths of exposed film of predetermined length from said strip and feeding the same into one of said film carriers, said film feeding means including a pair of rollers in frictional contact and arranged crosswise of the film advancing from the camera assembly with their axes parallel to the plane of the film, and a pivoting film guide member adapted to receive the advance end of the film and to guide it between said rollers in instant readiness to be gripped thereby as the rollers are rotated to charge the same into the particular one of said film carriers then temporarily positioned thereopposite.

2. In an automatic photo studio of the type adapted to have its complete operating cycle activated by a single initiating act performed by the subject being photographed and incorporating means for processing film to develop the same immediately following its exposure, that improvement which includes camera means for taking a plurality of views of the subject in sequence and registering the same on successive increments of film, means for supporting a supply roll of unexposed strip film and for feeding said strip in increments past the camera optical system in a manner to provide a vertical image of the subject crosswise of the film, means for automatically severing a strip of exposed film from unexposed film during successive operating cycles of said automatic photo studio, and conveyor means for receiving the severed film strip from said camera and for loading the same into a film carrier preparatory to the development of the film and including means for transporting said film carrier bodily through different developing liquids in succession.

3. In an automatic photo studio of the type adapted to have its complete operating cycle activated by a single initiating act performed by the subject being photographed and incorporating means for processing film to develop the same immediately following its exposure, that improvement which includes camera means having means for feeding a continuous strip of unexposed film from a supply roll transversely of the image-forming lens system of the camera with the vertical axis of the subject extending crosswise of the film strip, automatic means for advancing successive unexposed film increments of the same length past said lens system to form successive image impressions on the film, automatic means for severing successive strips of the same length from said supply roll after a series of separate images have been impressed thereon, means for conveying the severed strips of film to a developing chamber and for there charging the successive strips into a different film carrier where the individual strips remain stationary with respect to the respective supporting carriers while undergoing development.

4. In an automatic photo studio apparatus of the type adapted to have its entire operating cycle activated by an act of the subject being photographed, that improvement which comprises camera means including a housing, means for feeding a strip of unexposed film from a supply roll transversely across said camera housing with its light-sensitive side facing an image-forming lens system, said lens system including prism means for deflecting a vertical image of the subject through said lens system and onto said light-sensitive film with the vertical axis of the subject lying crosswise of the film width, automatic means for feeding separate unexposed increments of film of the same length sequentially past said lens system, shutter means coordinated with said film feeding means, and automatic means for severing identical lengths of exposed film from unexposed portions thereof and charging the successive lengths into a different film carrier for development as a plurality of said film carriers are indexed in succession past a film charging station forming part of said photo studio apparatus.

5. Photo studio apparatus as defined in claim 4 characterized in that said prism means is positioned to divert an image of the subject through said lens system and onto the light-sensitive surface of said film with the longitudinal axis of said image extending crosswise of the film strip.

6. In automatic photo studio apparatus of the type adapted to have its complete operating cycle activated by an act of the subject being photographed, that improvement which comprises camera means including a housing having an image receiving aperture in a wall thereof directly forwardly of the subject, means for supporting a supply roll of strip film adjacent said camera, means for feeding unexposed film transversely across said camera in the path of the subject image, means including a lens system for throwing a longitudinal image of the subject being photographed crosswise of said film strip, automatic means for severing a predetermined length of exposed film from said supply roll during successive operating cycles of said photo studio apparatus, power driven means for transporting said severed lengths of exposed film through successive developing steps while the successive strips are supported in separate film carriers and dispensing the developed strips from said separate film carriers in fully developed condition.

7. In automatic photo studio apparatus of the type adapted to have its operating cycle activated by an act of the subject being photographed and having camera mechanism for taking a series of photo images with the longitudinal axis of the image crosswise of the film strip, means for severing the exposed portion of the film from unexposed portions thereof, a plurality of film strip carrier means, means for loading said severed strip into one of said carrier means, means for indexing only a carrier loaded with film successively through a series of developing and washing operations in steps and including spider means from the periphery of which said carriers are movably supported, means for discharging developed film from said film carriers, and means movably supported on said spider and occupying one position when any carrier is loaded with film and a different position when no film is present in any carrier, said last mentioned means being effective when in said different position to discontinue the operation of said apparatus automatically as carrier means loaded with film is indexed through the final one of said developing and washing operations and the developed film therein is discharged.

8. Control mechanism for automatic photographic apparatus of the type having coin controlled camera means and a plurality of film developing and washing tanks arranged in a closed circuit, power driven conveyor means movably supporting thereon a plurality of film strip carriers, said carriers being movable between a retracted non-film transporting position and an extended position to receive film while being transported through a series of film developing steps, means for indexing said conveyor and any extended film carrier in steps into operative relationship with the liquid contents of said developing and washing tanks, means movably carried directly on said conveyor normally adapted to occupy one predetermined position when all of said carriers are in a retracted position and to occupy a second predetermined position when any one of said carriers is in the said extended position thereof, and means responsive to the position of said last mentioned means for discontinuing the operation of said conveyor means.

9. In an automatic film developing apparatus of the type having a plurality of developing fluid tanks arranged in a closed circuit, that improvement which comprises conveyor mechanism for the step-indexing of a plurality of film carriers through said developing tank circuit, means for driving said conveyor mechanism, and two-position means movably carried directly on said conveyor mechanism operable in one position thereof to discontinue the operation of said conveyor automatically after all carriers loaded with film have been indexed through a complete developing cycle and operable in the other position thereof to be ineffective to discontinue the indexing of said conveyor.

10. Automatic film developing apparatus as defined in claim 9 characterized in that said conveyor mechanism comprises a vertically supported reciprocable shaft, power driven means for alternately reciprocating said shaft and indexing it in increments about its own axis, spider means mounted on said shaft, a plurality of film developing carriers mounted on the outer ends of said spider means and movable between extended and retracted positions in one of which positions the carriers overlie developing fluid tanks and in the other of which positions said carriers are positioned laterally entirely to one side of said tanks, switch control means movably carried by said spider and having portions thereof positioned in the path of movement of said carriers when moving between the extended and retracted positions thereof, means for holding said switch control means in one predetermined steady position so long as said carriers are all in one position thereof, and any one of said carriers being effective to hold said switch control means in a second steady predetermined position so long as any carrier is in the other of said carrier positions.

11. Automatic film developing apparatus as defined in claim 10 characterized in the provision of electric switch means positioned to be actuated by said switch control means when the latter is in one steady position but not in the other steady position thereof.

12. Automatic film developing apparatus as defined in claim 10 characterized in that said switch control means includes a plurality of arms projecting from said shaft and similarly spaced apart circumferentially of said shaft, and switch means supported to one side of said spider having an actuator positioned to be actuated when said arms are in one but not in the other of the extreme positions thereof.

13. In automatic film developing apparatus of the type having a series of developing and washing tanks arranged in a ring for the sequential advance therethrough of a plurality of film carrier means, power driven indexing rotary conveyor means of the type operable to reciprocate said film carrier means vertically between steps of rotary indexing from tank to tank, and means for shifting said carrier means from a non-operating position lying radially outside said ring of tanks to a film developing position overlying said ring of tanks depending on whether a film is being presented for developing when the carrier is in a predetermined index position, that improvement which comprises control spider means movably supported directly on said rotary conveyor means and movable in unison therewith, means for holding said control means in a predetermined retracted position when all of said film carriers are in one of said operating positions, and said film carrier means including means for holding said control spider in a second predetermined position so long as any film carrier is in the other of the operating positions.

14. Apparatus of the type defined in claim 13 characterized in the provision of control switch means for initiating and terminating the operation of said automatic film developing apparatus, and actuator means for said switch means operable by said control spider means in one position thereof but inoperable to change the position of the switch means so long as said spider means is in the other of its positions.

15. Apparatus of the type defined in claim 13 characterized in the provision of a main control switch for said apparatus operable to de-activate said developing apparatus automatically after all film undergoing developing has been developed, said control switch including an actuator positioned in the path of movement of said control spider means while said film carrier means are being indexed provided all of said film carrier means are in their non-operating positions outside said ring of tanks, said control spider being inoperable to actuate said switch actuator so long as any film carrier is being indexed through a developing cycle by movement from one tank to another.

16. Shut-off mechanism for an automatic film developing apparatus of the type in which film strips undergoing developing are indexed successively through a series of liquid filled tanks by a power driven conveyor controlled by a two-position control switch, that improvement comprising a plurality of film carriers mounted on said conveyor for movement between operating and non-operating positions, switch actuator means for said control switch having separate portions thereof operably associated with each of said carriers and wherein all of said separate portions are movable in unison upon the movement of any carrier to an operating position, said actuator means then being ineffective to actuate said control switch for the power supply to said film developing apparatus but being effective to actuate said control switch to de-activate said film developing apparatus when said film carriers all occupy their said non-operating positions.

17. In automatic film developing apparatus of the type utilizing power driven conveyor mechanism for advancing strips of film successively through a series of developing solutions in a plurality of tanks arranged along said conveyor, said conveyor having a plurality of film carriers movably attached to said conveyor for movement between a retracted non-developing position and an extended developing position for advancement in a cycle of steps through solution in said tanks, a film loading station adjacent said conveyor including means for moving one of said retracted film carriers into its extended position when a film strip is presented for development and including means for loading the film into the extended carrier, that improvement which comprises control means for de-activating said power driven conveyor automatically only after all loaded film carriers have passed through a complete developing cycle, said control means including movable barrier means operatively associated with each of said carriers and held in a first predetermined position so long as any carrier is in an extended film developing position, means for returning said barrier means to a second predetermined position as an incident to the retraction of the last extended carrier, and means responsive to the positioning of said barrier means in said second position to de-activate the drive to said conveyor mechanism.

18. Apparatus as defined in claim 17 characterized in that said barrier means includes an arm positioned in the path of each carrier as the carrier moves between its extended and retracted positions, linkage means interconnecting all of said arms whereby movement of any one of said arms by a carrier effects movement of all of said arms, and means biasing said arms and linkage means to a position in readiness for movement to a different position upon movement of a carrier to the extended position thereof.

19. Control mechanism for use in an automatic film developing apparatus, comprising a rotatably supported hub having a plurality of arms projecting radially therefrom, film carriers movably supported on the outer ends of said arms each movable independently of one another between a retracted non-film developing position and an extended position wherein said carriers are adapted to be advanced in steps through film developing solutions in one of which said carriers are adapted to be charged with film for advancement in steps through developing solutions, control actuating means movably mounted on said hub and normally spring-biased to a control actuating position so long as all of said carriers are retracted, said control means including means actuable upon movement of any carrier to its extended position to de-activate said control actuating means, and the return of all carriers to their retracted positions permitting said spring-biasing means to restore said control actuating means to its control actuating position.

20. In automatic film developing apparatus of the type having means for indexing film to be developed through a series of developing tanks and including a rotary spider reciprocably supported for elevation of the film out of one tank as an incident to the indexing thereof to the next tank and lowering thereinto, that improvement which comprises control mechanisms for de-activating said indexing means automatically as the last film strip reaches the end of its developing cycle, said mechanism including a control spider having limited rotary movement about the axis of said rotary spider, said control spider being normally movable in unison with said rotary spider and being spring-biased to one of its two positions, and a control switch having an actuator positioned to operate said switch as film is being indexed toward the end of a developing cycle.

21. In automatic film developing apparatus of the type having means for indexing film to be developed through a series of developing tanks and including a rotary spider reciprocably supported for elevation of the film out of one tank as an incident to the indexing thereof to the next tank and lowering thereinto, that improvement which comprises control mechanism for de-activating said indexing means automatically as the last film strip reaches the end of its developing cycle, said mechanism including a single member movable between a first and a second position, cut-off means actuable by said single member when in said one position to actuate said cut-off means and de-activate said indexing means, and means operable so long as film is undergoing development in said developing apparatus to hold said single member in the said second position thereof and ineffective to actuate said cut-off means.

22. In automatic film developing apparatus of the type having means for indexing film to be developed through a series of developing tanks and including a rotary spider reciprocably supported for elevation of the film out of one tank as an incident to the indexing thereof to the next tank and lowering thereinto, that improvement which comprises control mechanism for de-activating said indexing means automatically as the last film strip reaches the end of its developing cycle, said mechanism including a unitary control spider movably supported co-axially of said rotary film indexing spider, cut-off means for de-activating said developing apparatus, means biasing said control spider to a position for actuating said cut-off means, and means for holding said control spider out of actuating position with respect to said cut-off means so long as film is present and undergoing development.

23. In automatic film developing apparatus, a film supporting spider having a plurality of arms each having pivoted to its outer end a film carrier support, said support being movable between retracted and extended positions in one of which the film carrier is positioned for emersion into tanks of developing solution, a unitary control spider co-axially supported on said film supporting spider and movable through a limited path relative thereto, means normally biasing said control spider in one direction, and said control spider having portions thereof extending into the path of movement of each of said film carrier supports and being movable therewith in opposition to said biasing means when any one of said film carriers is moved in a predetermined direction between the retracted and extended positions thereof whereby said control spider can be utilized to actuate control devices in accordance with the movement of any carrier from a preselected position thereof.

24. Automatic photo studio apparatus as defined in claim 2 characterized in that said film processing means includes a plurality of film carriers supported on conveyor means for indexing said carriers successively through different developing steps and including an index station wherein the carriers are successively positioned to receive an exposed strip of film discharging from said camera means, means movably supported by said conveyor means held in one steady position so long as any carrier is loaded with film and occupying a second steady position so long as no film is present in any carrier, and means for de-activating said photo studio apparatus when said last mentioned means is occupying said second steady position thereof wherein no carrier contains a film load.

25. Automatic photo studio apparatus as defined in claim 3 characterized in that a plurality of film developing tanks are arranged in a closed circuit in said film developing chamber, movable conveyor means for indexing a plurality of film carriers through said developing tank circuit, means for loading exposed film from said camera means into the adjacent one of said carriers, and two-position means movably carried by said movable conveyor means operable in one position thereof to discontinue the operation of said conveyor means automatically after all carriers loaded with film have been indexed through a complete developing cycle and operable in the other position thereof to be ineffective to discontinue the indexing of film carriers.

References Cited in the file of this patent

UNITED STATES PATENTS

| | | |
|---|---|---|
| 1,825,709 | Bacino | Oct. 6, 1931 |
| 1,862,190 | McCowan | June 7, 1932 |
| 1,939,144 | Simjian | Dec. 12, 1933 |
| 2,176,573 | Hershberg | Oct. 17, 1939 |
| 2,183,742 | Hershberg | Dec. 19, 1939 |
| 2,380,378 | Allen | July 31, 1945 |
| 2,440,314 | Turner | Apr. 27, 1948 |
| 2,553,014 | Singer | May 15, 1951 |
| 2,916,976 | Applegate et al. | Dec. 15, 1959 |